(12) United States Patent
Rager et al.

(10) Patent No.: US 12,534,449 B2
(45) Date of Patent: Jan. 27, 2026

(54) STABLE CRYSTALLINE HYDRATE OF CLAZOSENTAN DISODIUM SALT

(71) Applicant: Idorsia Pharmaceuticals Ltd, Allschwil (CH)

(72) Inventors: Timo Rager, Allschwil (CH); Markus Von Raumer, Allschwil (CH)

(73) Assignee: Idorsia Pharmaceuticals Ltd, Allschwil (CH)

( * ) Notice: Subject to any disclaimer, the term of this patent is extended or adjusted under 35 U.S.C. 154(b) by 453 days.

(21) Appl. No.: 18/251,814

(22) PCT Filed: Nov. 4, 2021

(86) PCT No.: PCT/EP2021/080589
§ 371 (c)(1),
(2) Date: May 4, 2023

(87) PCT Pub. No.: WO2022/096549
PCT Pub. Date: May 12, 2022

(65) Prior Publication Data
US 2023/0373967 A1    Nov. 23, 2023

(30) Foreign Application Priority Data

Nov. 5, 2020    (WO) .................. PCT/EP2020/081085

(51) Int. Cl.
*C07D 401/14*    (2006.01)
(52) U.S. Cl.
CPC ........ *C07D 401/14* (2013.01); *C07B 2200/13* (2013.01)
(58) Field of Classification Search
CPC .................................................. C07D 401/14
See application file for complete search history.

(56) References Cited

FOREIGN PATENT DOCUMENTS

| EP | 0979822 A1 | 2/2000 |
| EP | 0897914 B1 | 5/2004 |
| WO | WO 96/19459 A1 | 6/1996 |

OTHER PUBLICATIONS

Nureki et al. (Nature Structural & Molecular Biology vol. 24, pp. 758-764 (2017)) (Year: 2017).*
Caira, M., "Crystalline Polymorphism of Organic Compounds," in Topics in Current Chemistry, Springer, Berlin, 1998, vol. 198, pp. 163-208.
ClinicalTrials.gov, NCT00940095, "Clazosentan in Aneurysmal Subarachnoid Hemorrhage (Conscious-3)," First Posted date listed as: Jul. 15, 2009, Last Update Posted date listed as: Jul. 9, 2018, 8 pages, retrieved on May 9, 2023, from: https://clinicaltrials.gov/ct2/show/NCT00940095.
ClinicalTrials.gov, NCT03585270, "Clinical Research Study With Clazosentan to Evaluate Its Effects on Preventing Complications Due to the Narrowing of the Blood Vessels (Vasospasm) in the Brain, Caused by Bleeding Onto the Surface of the Brain (REACT)," First Posted date listed as: Jul. 12, 2018, Last Update Posted date listed as: Feb. 14, 2023, 9 pages, retrieved on May 9, 2023, from: https://clinicaltrials.gov/ct2/show/NCT03585270.
Greisser, U., "The Importance of Solvates," in Polymorphism in the Pharmaceutical Industry, Wiley-VCH, Weinheim, Germany, copyright 2006, 211-233.
JapicCTI-163368, JCRT Id: jRCT2080223313, "A double-blind study to assess the efficacy and safety of clazosentan in reducing cerebral vasospasm in patients with aneurysmal subarachnoid hemorrhage treated by surgical clipping," Registered date listed as: May 9, 2016, 3 pages.
JapicCTI-163369, JCRT Id: jRCT2080223314, "A double-blind study to assess the efficacy and safety of clazosentan in reducing cerebral vasospasm in patients with aneurysmal subarachnoid hemorrhage treated by endovascular coiling," Registered date listed as: May 9, 2016, 3 pages.
Remington, The Science and Practice of Pharmacy, 21st Edition, 2005, Part 5, "Pharmaceutical Manufacturing," published by Lippincott Williams & Wilkins.
Reutzel-Edens, S. et al., Chapter 9, Physical Characterization of Hygroscopicity in Pharmaceutical Solids, Polymorphism: in the Pharmaceutical Industry, 2006, 235-258.

* cited by examiner

*Primary Examiner* — John S Kenyon
*Assistant Examiner* — Rehana Ismail
(74) *Attorney, Agent, or Firm* — Hoxie & Associates LLC

(57) ABSTRACT

The present invention relates to a stable hydrate of clazosentan disodium salt, pharmaceutical formulations manufactured using the same and their use as medicaments.

19 Claims, 8 Drawing Sheets

STABLE CRYSTALLINE HYDRATE OF CLAZOSENTAN DISODIUM SALT

CROSS REFERENCE TO RELATED APPLICATIONS

This application is a National Stage Entry under 35 U.S.C. § 371 of International Application No. PCT/EP2021/080589 filed Nov. 4, 2021, which claims priority to International Application No. PCT/EP2020/081085 filed Nov. 5, 2020, the contents of each of which are hereby incorporated by reference in their entireties.

The present invention relates to a novel stable crystalline hydrate of clazosentan disodium salt, a process for the preparation thereof, pharmaceutical formulations comprising the same and their use in the manufacture of a medicament for use as endothelin receptor antagonist in the treatment or prevention of diseases or disorders, where endothelin receptors are involved, especially for use in the prevention and/or treatment of cerebral vasospasm and its subsequent ischemic effects/symptoms after life-threatening aneurysmal subarachnoid hemorrhage (aSAH).

Clazosentan disodium salt (hereinafter also referred to as "COMPOUND") is known under several systematic names such as 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide disodium salt or 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide sodium salt (1:2). Clazosentan is also known in the art under its laboratory codes ACT-108475 (free acid), AXV-034343 (free acid), AXV-034343A (disodium salt), ACT-108475A (disodium salt), VML 588, and Ro 61-1790. COMPOUND may be represented by the following structure.

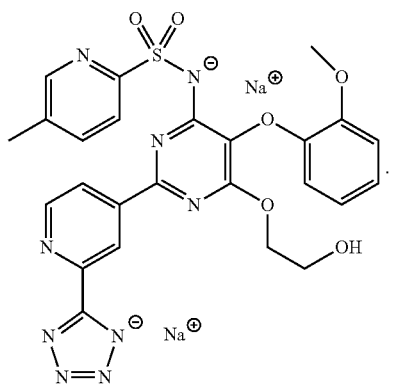

Formula 1

In accordance with the present invention a novel crystalline hydrate of COMPOUND has been found that may provide advantageous physical and/or chemical properties such as especially improved physical stability due to low water uptake over a broad humidity range, which thus may significantly increase shelf-life of drug substance/product; simplify and reduce cost of material handling/transportation/storage/testing during manufacturing; reduce agglomerate formation under storage conditions; improve homogeneity of bulk material; allow for minor changes in molar mass over a broad humidity range and thereby simplify dosing in drug product manufacturing; and/or improve further quality parameters as provided by standard monographs and guidelines in the pharmaceutical industry.

WO9619459, EP0897914 and EP0979822 disclose several endothelin receptor antagonists such as clazosentan and their synthesis. Clazosentan has been evaluated in diseases and/or conditions related to aneurysmal subarachnoid hemorrhage (aSAH) in several human clinical trials e.g. NCT00940095, NCT03585270, JapicCTI-163369, and JapicCTI-163368.

| Figure | Form | Angles of refraction 2theta (relative peak intensities) |
|---|---|---|
| 1 | B | 7.6° (51%), 8.1° (100%), 10.5° (51%), 11.6° (38%), 13.0° (35%), 24.3° (54%) |
| 2 | B1 | 7.8° (100%), 10.5° (28%), 17.2° (17%), 20.2° (19%), 23.2° (23%), 23.8° (62%) |
| 3 | C | 7.4° (44%), 7.6° (63%), 10.6° (37%), 12.0° (36%), 16.7° (44%), 18.5° (40%), 22.8° (51%), 24.3° (58%), 25.0° (100%), 25.4° (38%). |
| 4 | E | 8.5° (100%), 8.7° (37%), 10.7° (56%), 17.0° (27%), 18.0° (29%), 22.8° (21%), 24.0° (21%), 25.7° (34%) |
| 5 | L | 8.2° (79%), 8.7° (36%), 10.0° (100%), 21.1° (34%), 25.1° (25%), 26.3° (24%) |
| 6 | M | 7.3° (14%), 8.7° (100%), 13.6° (16%), 16.7° (7%), 19.6° (7%), 21.5° (11%), 21.7° (23%), 26.2° (7%) |
| 7 | N | 7.7° (100%), 8.4° (99%), 8.8° (41%), 10.5° (20%), 17.6° (23%), 18.0° (25%), 23.4° (25%), 24.4° (24%), 24.9° (18%) |

| Figure | Form | Angles of refraction 2theta (relative peak intensities) |
|---|---|---|
| 8 | P | 7.3° (71%), 11.6° (64%), 15.1° (88%), 16.9° (47%), 20.5° (54%), 21.7° (47%), 23.9° (100%), 25.6° (77%) |
| 9 | Reference Example 1 | n/a |

For avoidance of any doubt, the above-listed peaks describe the experimental results of the X-ray powder diffraction shown in FIGS. 1 to 8. It is understood that, in contrast to the above peak lists, only a selection of characteristic peaks is required to fully and unambiguously characterize COMPOUND in the respective crystalline form of the present invention.

FIGS. 10 to 15 show the gravimetric vapor sorption analysis (GVS) of COMPOUND in the corresponding crystalline hydrate forms (as shown in the Table below), wherein the relative change in mass (%) due to water uptake or release is displayed against relative humidity (%).

| Figure | Form |
|---|---|
| 10 | C |
| 11 | E |
| 12 | L |
| 13 | M |
| 14 | N |
| 15 | P |

Figure 16:
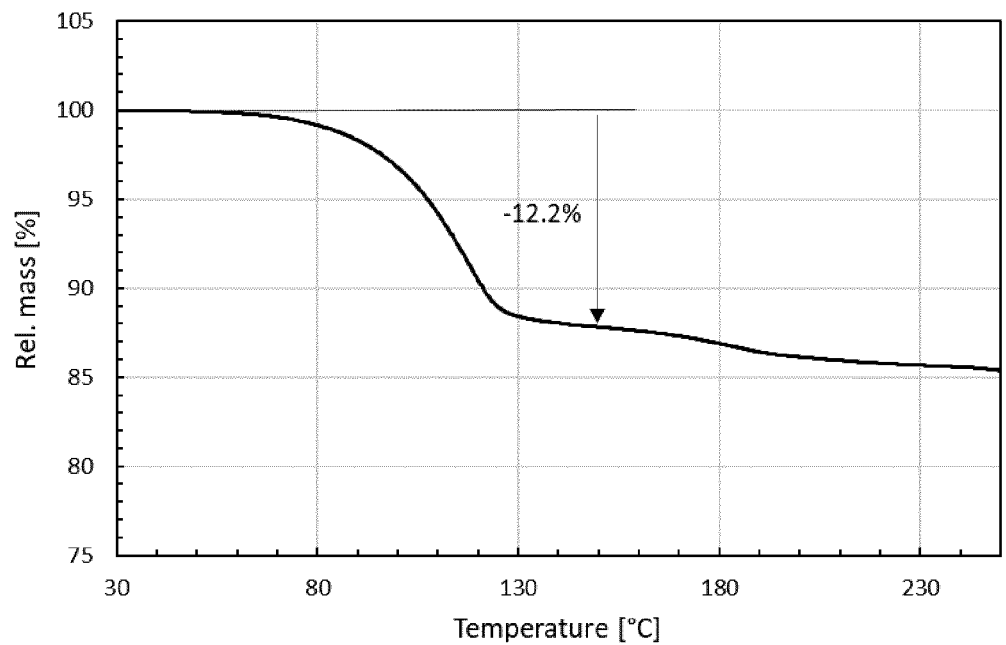

FIG. 16 shows the thermogravimetric analysis (TGA) of COMPOUND in crystalline hydrate form C, wherein the relative mass (% of the total mass of the sample) on the vertical axis is displayed against temperature (° C.).

DETAILED DESCRIPTION OF THE INVENTION

1) One aspect of the invention relates to a crystalline hydrate of COMPOUND.

It is understood that the crystalline hydrate according to any one of the embodiments herein may comprise non-coordinated solvent (notably water), in addition to the coordinated water. Non-coordinated solvent (notably water) is used herein as a term for physisorbed or physically entrapped solvent (notably water) (definitions according to Polymorphism in the Pharmaceutical Industry (Ed. R. Hilfiker, VCH, 2006), Chapter 8: U. J. Griesser: The Importance of Solvates). The crystalline hydrates described herein may comprise non-coordinated water and/or one or more non-coordinated organic solvent(s). It is further understood that the crystalline hydrates according to any one of the embodiments disclosed herein are solid.

2) Another embodiment relates to a crystalline hydrate according to embodiment 1), wherein the crystalline hydrate comprises from about 4.5 to about 5.5 (notably from 4.7 to about 5.3; especially from about 4.5 to about 5.0) equivalents of coordinated water.

3) Another embodiment relates to a crystalline hydrate according to embodiment 1), wherein the crystalline hydrate comprises about 5.0 equivalents [i.e. about 12.7% w/w (notably relative to the wet weight of COMPOUND)] of coordinated water. The crystalline hydrate according to embodiment 3) can be seen as the corresponding hydrate in its fully hydrated state.

4) Another embodiment relates to a crystalline hydrate according to embodiment 1), wherein the crystalline hydrate comprises from about 11.5% w/w to about 13.7% w/w (notably from about 12% w/w to about 13.3% w/w; especially from about 11.5% w/w to about 12.7% w/w) coordinated water (notably relative to the wet weight of COMPOUND).

The amounts of coordinated water expressed in "% w/w" as defined in any of the embodiments disclosed herein are calculated relative to the wet weight of COMPOUND, i.e. relative to the weight of COMPOUND in the corresponding hydrated form. It is understood that determining the amount of coordinated water relative to the wet weight of COMPOUND comprises drying a certain amount of COMPOUND in its hydrated form until complete removal of the water and calculating the weight loss relative to said certain amount. The amounts of coordinated water expressed in "% w/w" as defined in any of the embodiments disclosed herein may also be expressed relative to the dry weight of COMPOUND, i.e. relative to the weight of COMPOUND after complete removal of all crystal water. Such complete removal of crystal water may be achieved e.g. by exposing the hydrates of COMPOUND as described herein to 0% relative humidity at 25° C. (in e.g. in the GVS apparatus mentioned in the present application) for 1 to 4 hours or longer. Thus, embodiment 4) may also be recited to relate to a crystalline hydrate according to embodiment 1), wherein the crystalline hydrate comprises from about 13.0% w/w to about 15.9% w/w (notably from about 13.6% w/w to about 15.4% w/w; especially from about 13.0% w/w to about 14.5% w/w) coordinated water, relative to the dry weight of COMPOUND.

Figure 10:
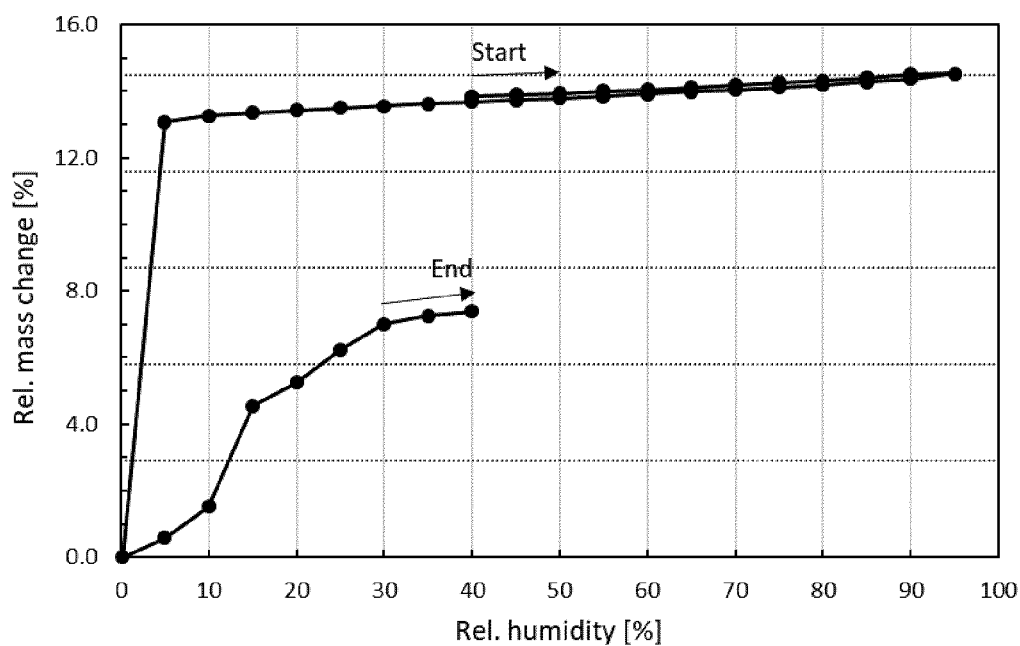
Figure 11:
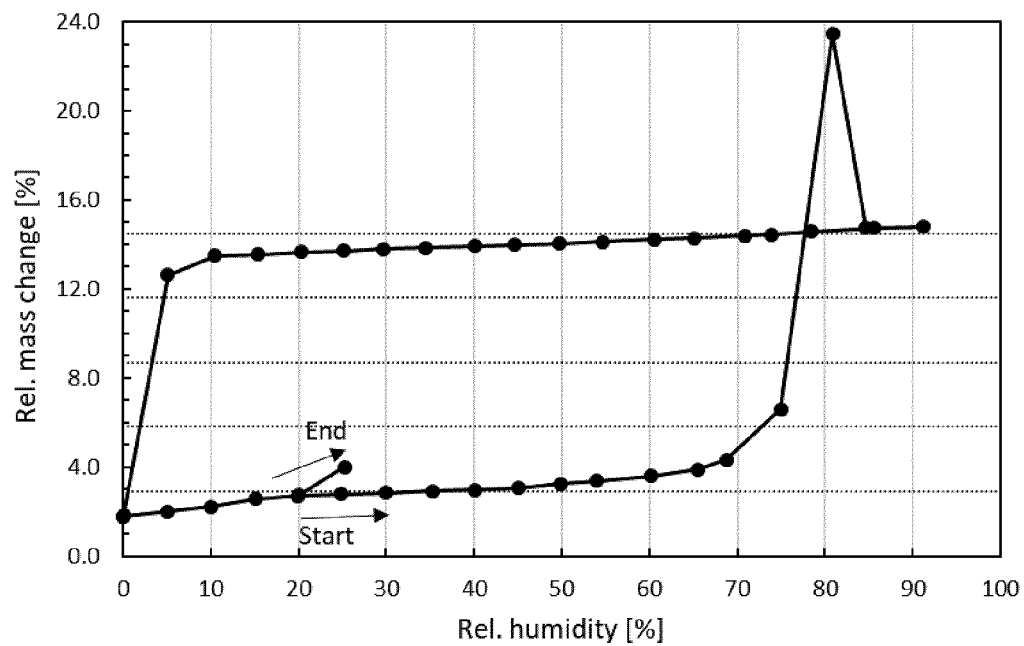
Figure 12:
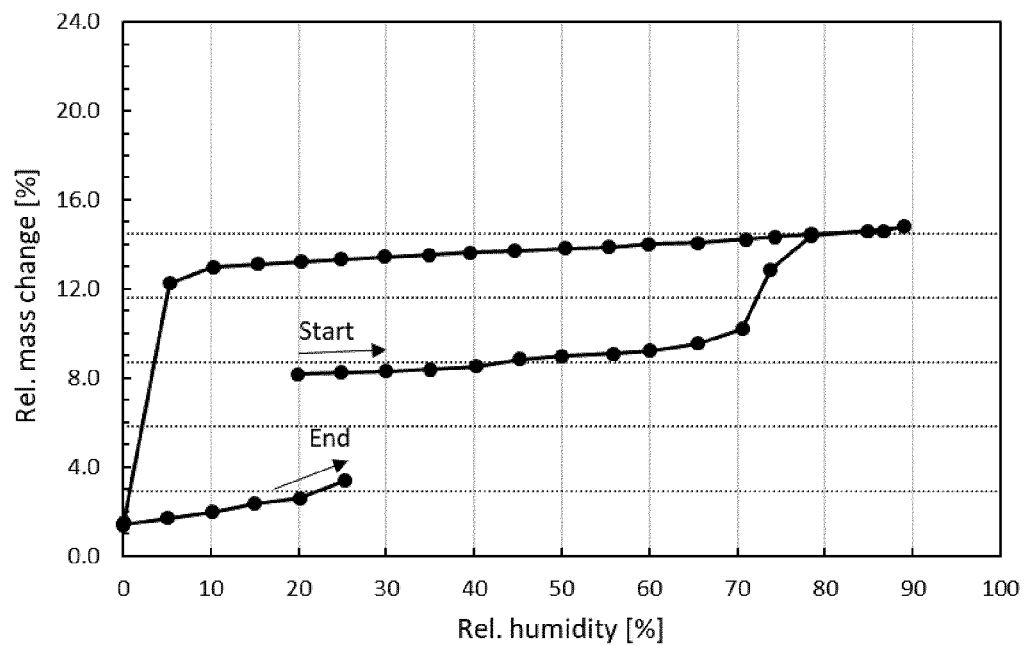
Figure 13:
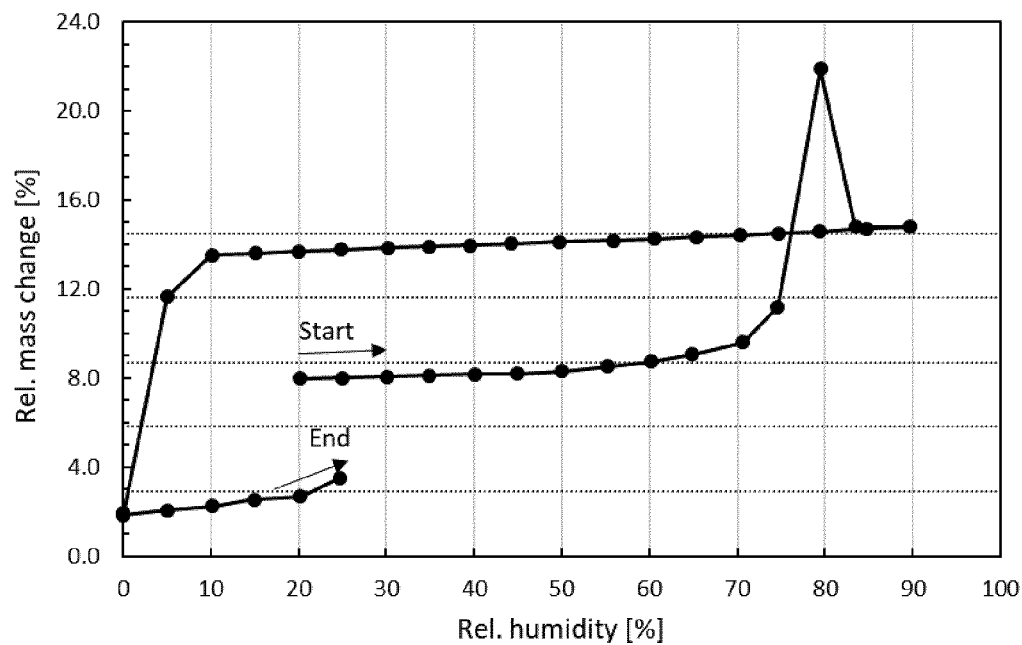
Figure 14:
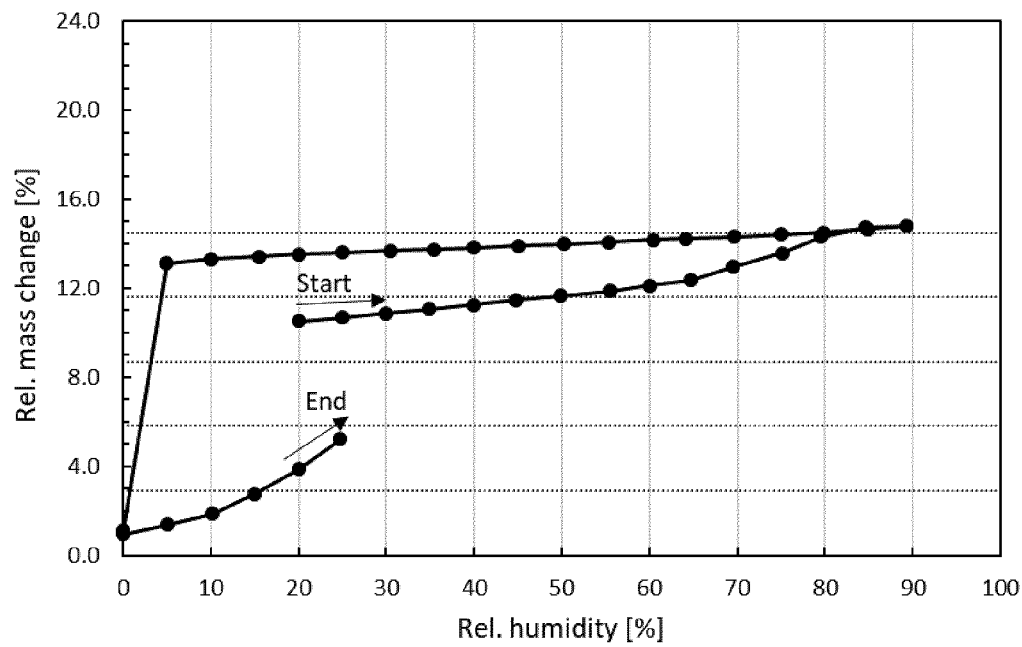
Figure 15:
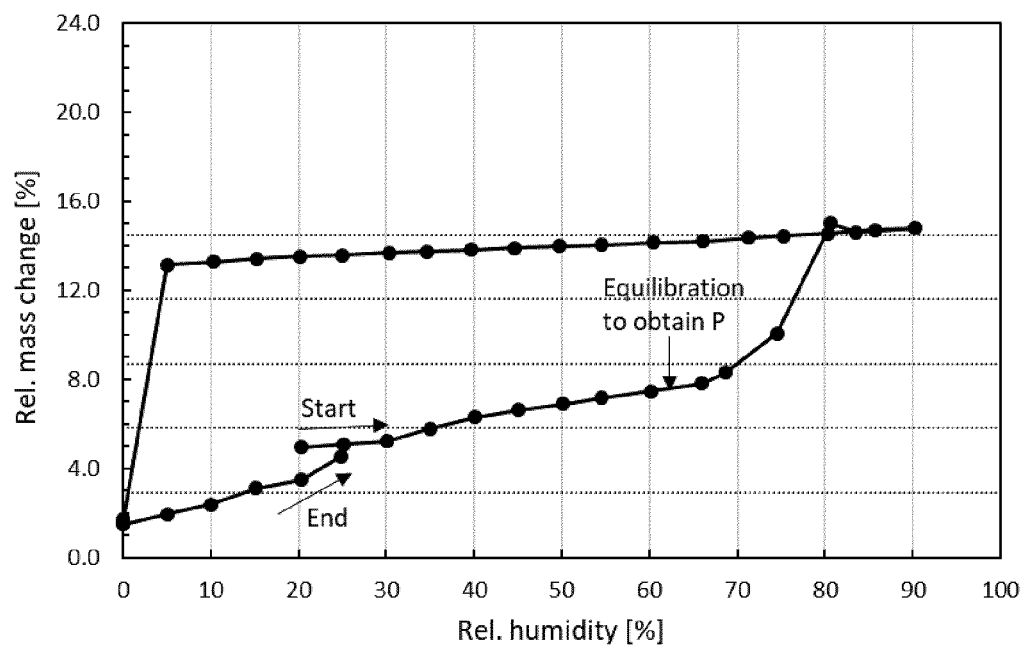

5) Another embodiment relates to a crystalline hydrate according to any one of embodiments 1) to 3), wherein the crystalline hydrate has a TGA curve substantially as shown in FIG. 16; and/or a GVS curve substantially as shown in FIG. 10.

6) Another embodiment relates to a crystalline hydrate according to any one of embodiments 1) to 5), wherein the crystalline hydrate is characterized by the presence of peaks in the X-ray powder diffractogram at the following angles of refraction 2θ:7.6°, 24.3°, and 25.0°.

7) Another embodiment relates to a crystalline hydrate according to any one of embodiments 1) to 5), wherein the crystalline hydrate is characterized by the presence of peaks in the X-ray powder diffractogram at the following angles of refraction 2θ:7.6°, 10.6°, 18.5°, 24.3°, and 25.0°.

8) Another embodiment relates to a crystalline hydrate according to any one of embodiments 1) to 5), wherein the crystalline hydrate is characterized by the presence of peaks in the X-ray powder diffractogram at the following angles of refraction 2θ:7.4°, 7.6°, 10.6°, 12.0°, 16.7°, 18.5°, 22.8°, 24.3°, 25.0° and 25.4°.

Figure 1:
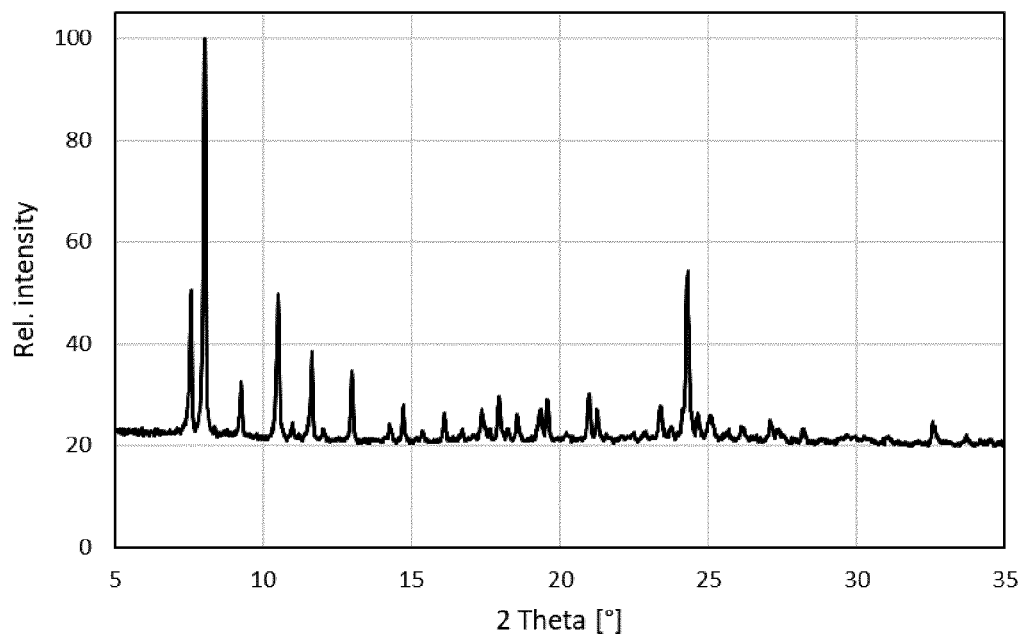
FIGS. 1 to 8 show the X-ray powder diffractograms of COMPOUND in the corresponding crystalline solvate/hydrate forms as shown in the Table below, wherein the X-ray powder diffractogram is displayed as a function of the diffraction angle 2θ of Cu Kα radiation. The X-ray diffractograms show peaks having a relative intensity, as compared to the most intense peak in the diagram, of the following percentages (relative peak intensities given in parenthesis) at the indicated angles of refraction 2theta (selected peaks from the range 5-35° 2theta with relative intensity larger or equal than 10% are reported).
Figure 2:
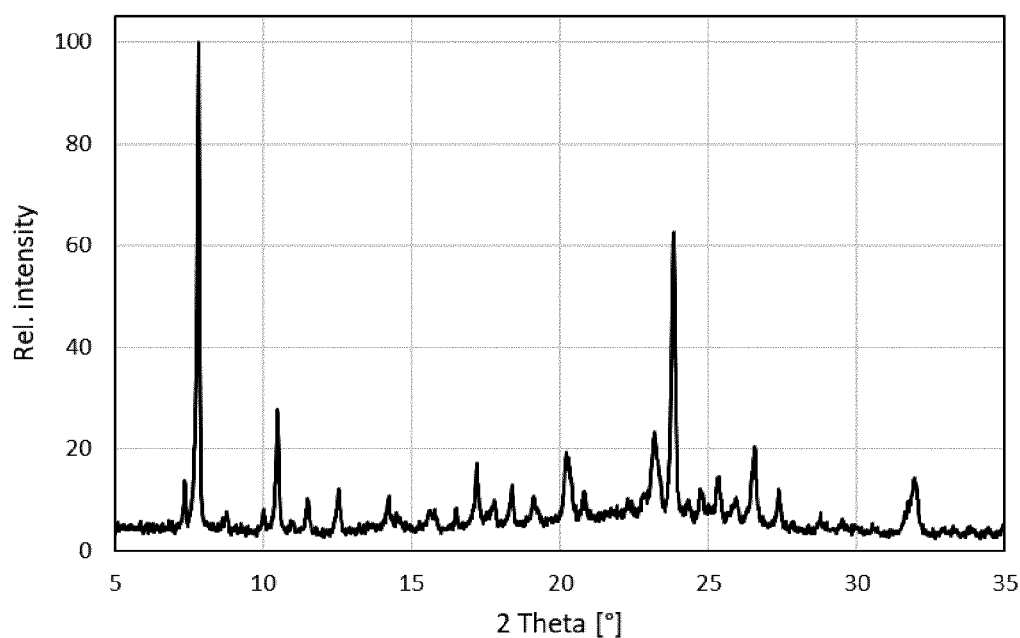
Figure 3:
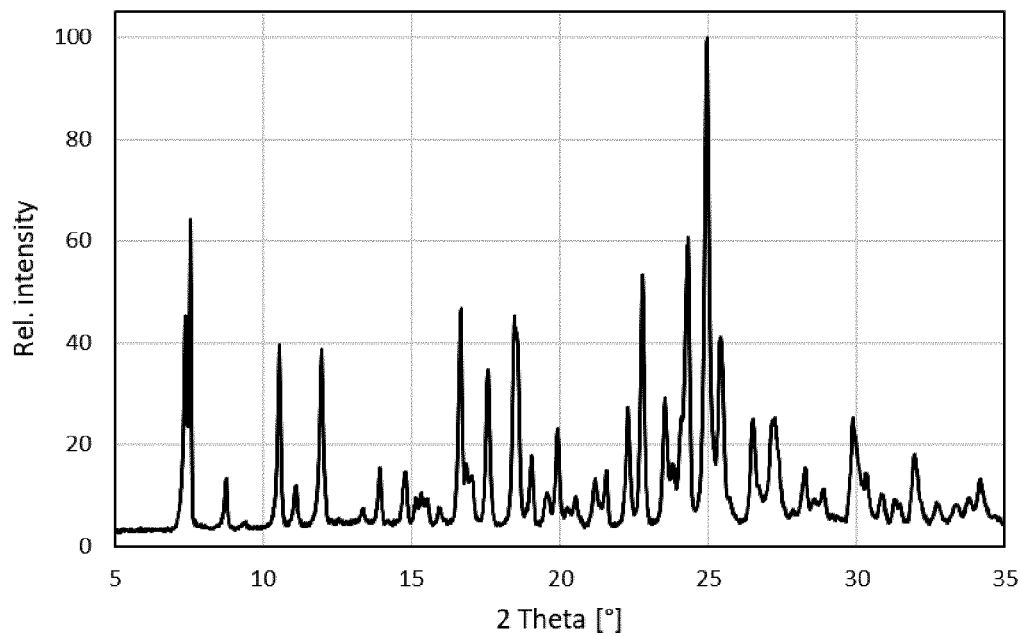
Figure 4:
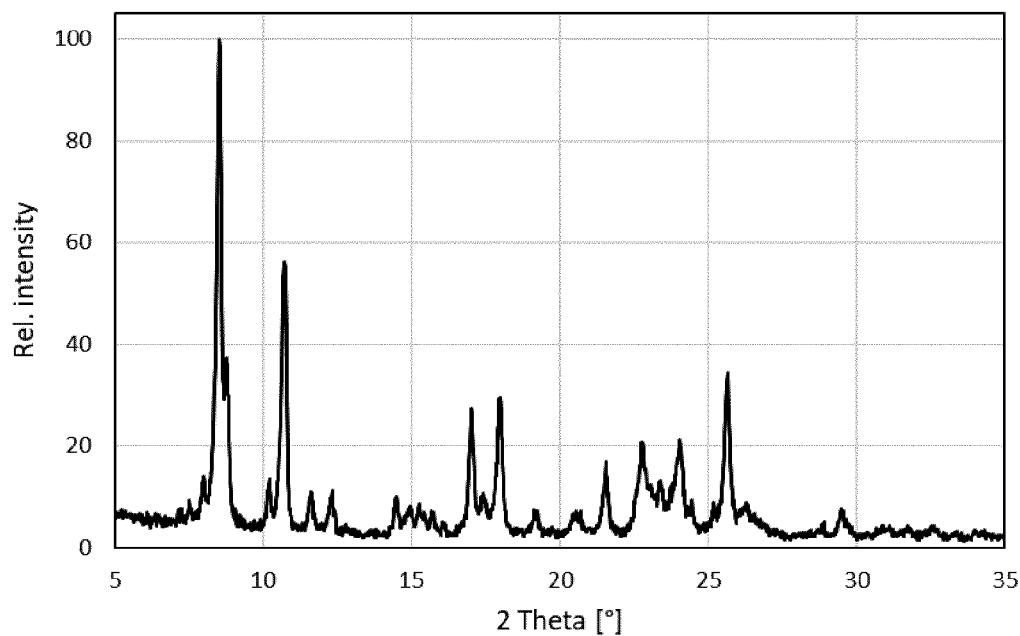
Figure 5:
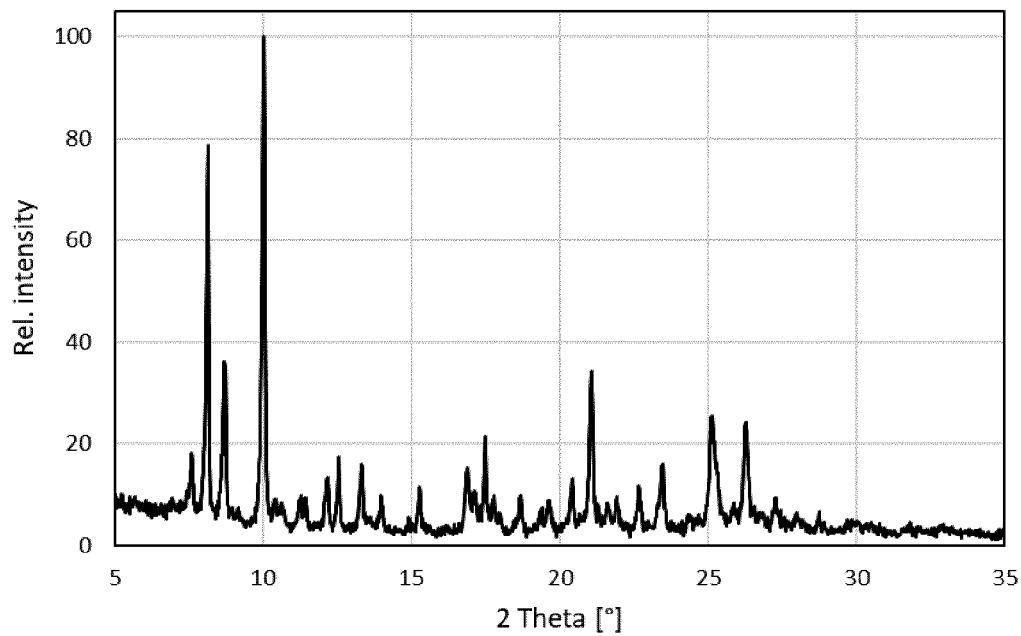
Figure 6:
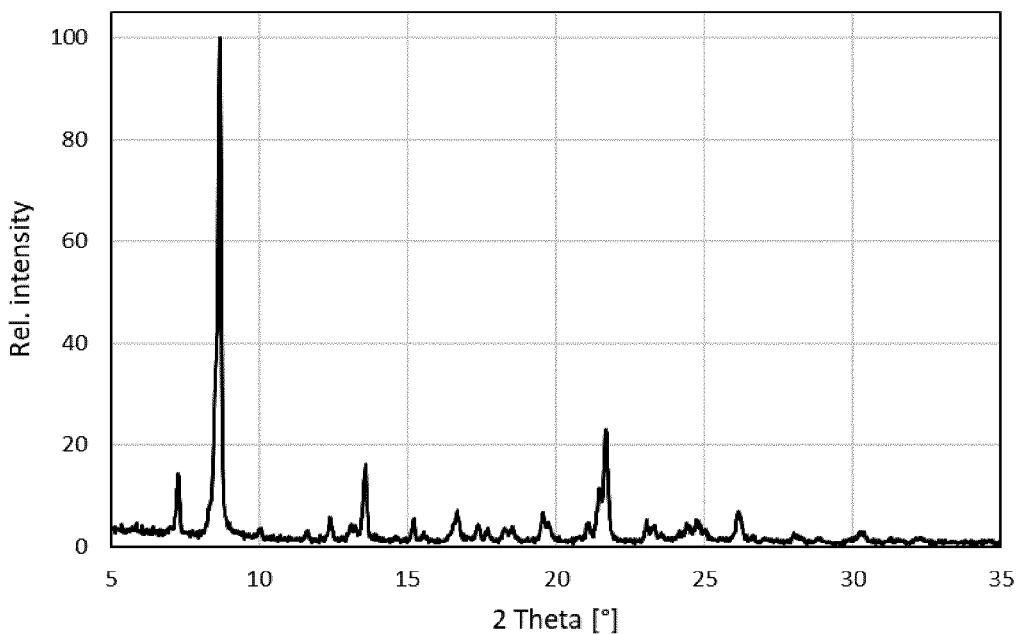
Figure 7:
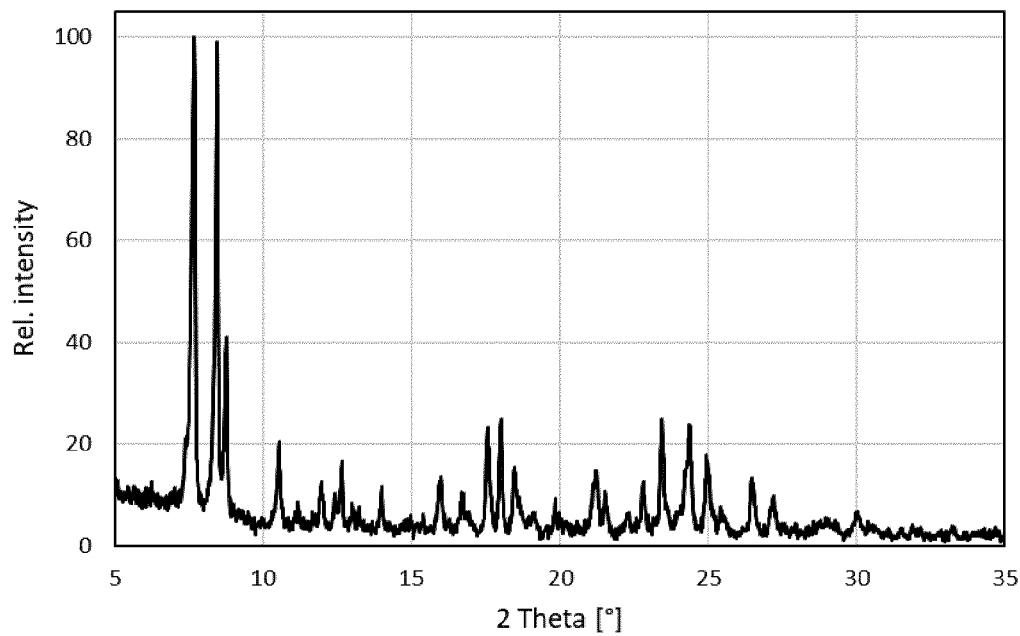
Figure 8:
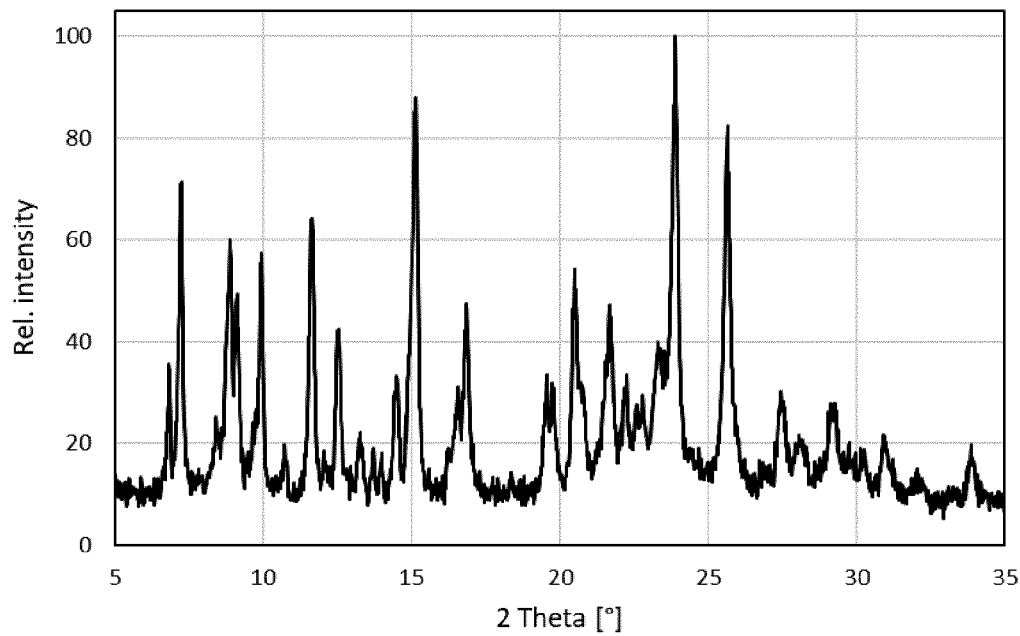

9) Another embodiment relates to a crystalline hydrate according to any one of embodiments 1) to 5), which essentially shows the X-ray powder diffraction pattern as depicted in FIG. 3.

For avoidance of any doubt, whenever one of the above embodiments refers to "peaks in the X-ray powder diffractogram at the following angles of refraction 2θ", said X-ray powder diffractogram is obtained by using combined Cu Kα1 and Kα2 radiation, without Kα2 stripping; and it should be understood that the accuracy of the 2θ values as provided herein is in the range of +/−0.1-0.2°. Notably, when specifying an angle of refraction 2theta (2θ) for a peak in the invention embodiments and the claims, the 2θ value given is to be understood as an interval from said value minus 0.2° to said value plus 0.2° (2θ+/−0.2°); and preferably from said value minus 0.1° to said value plus 0.1° (2θ+/−0.1°).

Where the plural form is used for compounds, solids, forms, hydrates, compositions, diseases and the like, this is intended to mean also a single compound, solid, form, hydrate, composition, disease or the like.

Definitions provided herein are intended to apply uniformly to the subject matter as defined in any one of the embodiments disclosed herein, and, mutatis mutandis, throughout the description and the claims unless an otherwise expressly set out definition provides a broader or narrower definition. It is well understood that a definition or preferred definition of a term or expression defines and may replace the respective term or expression independently of (and in combination with) any definition or preferred definition of any or all other terms or expressions as defined herein.

When defining the presence of peaks in e.g. an X-ray powder diffractogram, a common approach is to do this in terms of the S/N ratio (S=signal, N=noise). According to this definition, when stating that a peak has to be present in a X-ray powder diffractogram, it is understood that the peak in the X-ray powder diffractogram is defined by having an S/N ratio (S=signal, N=noise) of greater than x (x being a numerical value greater than 1), usually greater than 2, especially greater than 3.

In the context with stating that the crystalline form essentially shows an X-ray powder diffraction pattern as depicted in a Figure, respectively, the term "essentially" means that at least the major peaks of the diagram depicted in said figures, i.e. those having a relative intensity of more than 20%, especially more than 10%, as compared to the most intense peak in the diagram, have to be present. However, the person skilled in the art of X-ray powder diffraction will recognize that relative intensities in X-ray powder diffractograms s may be subject to strong variations e.g. due to preferred orientation effects that may result in missing peaks or intensity variations of single peaks.

Unless used regarding temperatures, the term "about" placed before a numerical value "X" refers in the current application to an interval extending from X minus 10% of X to X plus 10% of X, and preferably to an interval extending from X minus 5% of X to X plus 5% of X; most preferred is X. In the particular case of temperatures, the term "about" placed before a temperature "Y" refers in the current application to an interval extending from the temperature Y minus 10° C. to Y plus 10° C., preferably to an interval extending from Y minus 5° C. to Y plus 5° C. Room temperature means a temperature of about 25° C.

Whenever terms such as "between X and Y"; "X to Y"; "from X to Y"; or "X-Y", are used to describe a numerical range, it is to be understood that the end points "X" and "Y" of the indicated range are explicitly included in the range. For example, if a temperature range is described to be between 40° C. and 80° C. (or 40° C. to 80° C.), this means that the end points 40° C. and 80° C. are included in the range. Another example where the term "about" is used in combination with the above range definitions is the expression "from about 4.5 to about 5.5" as used herein, where the end points about 4.5 and about 5.5 are explicitly included in the range.

10) Another aspect relates to a crystalline hydrate of COMPOUND according to any one of embodiments 1) to 9), wherein the crystalline hydrate is obtainable by a process comprising exposing a first crystalline hydrate of COMPOUND to relative ambient humidity of at least 70% (especially at least 80%) until the crystalline hydrate according to any one of embodiments 1) to 9) is formed, wherein said first crystalline hydrate comprises from about 1 to about 4 equivalents of coordinated water.

11) Another embodiment relates to a crystalline hydrate of COMPOUND according to any one of embodiments 1) to 9), wherein the crystalline hydrate is obtainable by a process comprising precipitating COMPOUND from an aqueous solution (of COMPOUND) by adding at least one water miscible organic solvent to said aqueous solution such that the water activity in the mixture of water and the water miscible organic solvent(s) is at least about 0.2 (notably at least about 0.3; especially at least about 0.6).

The term "water activity" as used herein refers to the partial vapor pressure of water in the mixture of water and at least one water miscible organic solvent divided by the partial vapor pressure of pure water at the same temperature. For example, the water activity of a solvent mixture comprising about 4% water and about 96% isopropanol is about 0.3.

12) Another embodiment relates to a crystalline hydrate of COMPOUND according to any one of embodiments 1) to 9), obtainable by the process of embodiment 11), wherein the process comprises the following steps (especially in the following order)
  i) dissolving COMPOUND in water under heating until a saturated solution is obtained (especially at a concentration of about 0.5 g/mL);
  ii) cooling the solution (especially to room temperature);
  iii) adding at least one water miscible organic solvent such that the water activity in the mixture of water and the water miscible organic solvent(s) is at least about 0.2 (notably at least about 0.3; especially at least about 0.6; preferably adding about 10 to about 20 mL of 2-propanol per 1 g of COMPOUND).
  iv) optionally stirring (notably at room temperature for one or two weeks; especially two weeks); and
  v) isolating the solid residue by solid-liquid separation (especially by filtration).

13) Another aspect relates to a process of manufacture of a crystalline hydrate of COMPOUND according to any one of embodiments 1) to 9), wherein the process comprises the step of exposing a first crystalline hydrate of COMPOUND to relative ambient humidity of at least 70% (especially at least 80%) until the crystalline hydrate according to any one of embodiments 1) to 9) is formed, said first crystalline hydrate comprising from about 1 to about 4 equivalents of coordinated water.

14) Another embodiment relates to a process of manufacture of a crystalline hydrate of COMPOUND according to any one of embodiments 1) to 9), said process comprising precipitating COMPOUND from an aqueous solution (of COMPOUND) by adding at least one water miscible organic solvent to said aqueous solution such that the water activity in the mixture of water and the water miscible organic solvent(s) is at least 0.2 (notably at least 0.3; especially at least 0.6).

15) Another embodiment relates to a process according to embodiment 14), wherein the process comprises the following steps (especially in the following order)
  i) dissolving COMPOUND in water under heating until a saturated solution is obtained (especially at a concentration of about 0.5 g/mL);
  ii) cooling the solution (especially to room temperature);
  iii) adding at least one water miscible organic solvent such that the water activity in the mixture of water and the water miscible organic solvent(s) is at least about 0.2 (notably at least about 0.3; especially at least about 0.6; preferably adding about 10 to about 20 mL of 2-propanol per 1 g of COMPOUND).
  iv) optionally stirring (notably at room temperature for one or two weeks; especially two weeks); and
  v) isolating the solid residue by solid-liquid separation (especially by filtration). COMPOUND has a solubility of about 25 g in 100 mL of water at room temperature.

The water miscible organic solvent/s as referred to in embodiments 11, 12, 14 and 15 is/are selected from the group consisting of lower alcohols, tetrahydrofuran, acetonitrile, dimethyl sulfoxide, acetone, dimethylformamide, 1,4-dioxane, diethylene glycol dimethyl ether, and 1,2-dimethoxyethane; notably lower alcohols (such as methanol, ethanol, 1-propanol, 2-propanol, and iso-butanol), tetrahydrofuran, acetonitrile, dimethyl sulfoxide, acetone and dimethylformamide; especially methanol, ethanol, 1-propanol, 2-propanol, iso-butanol, tetrahydrofuran, acetonitrile, dimethyl sulfoxide; in particular 2-propanol.

The term "lower alcohols" refers to mono-, di- or poly-valent alcohols i.e. to alcohols bearing 1, 2, or more hydroxyl groups, said hydroxyl group(s) being attached to a $C_{1-5}$-alkane by substitution of one or more hydrogen atoms. The term "$C_{1-5}$-alkane" refers to a saturated, straight or branched hydrocarbon chain consisting of one to five carbon atoms. Examples of lower alcohols are methanol, ethanol, 1-propanol, 2-propanol, 1-butanol, iso-butanol, 2-methyl-propan-2-ol, 2-methyl-propan-1-ol, 1-pentanol, 2-pentanol, 3-pentanol, 1-hexanol, 2-hexanol, 3-hexanol, ethylene glycol, propylene glycol, glycerol; notably methanol, ethanol, 1-propanol, 2-propanol; especially 2-propanol.

16) In a sub-embodiment of any one of embodiments 12) or 15) about 1 wt. of COMPOUND is being dissolved in about 2 wt. of water (especially under heating).

17) In a sub-embodiment of any one of embodiments 11), 12), 14) and 15), the water miscible organic solvent/s is/are added until precipitation is formed.

The isolation step v) in embodiments 12) or 15) may be performed by any method known in the art used for separation of solid material from a liquid, preferably by filtration.

It is understood that exposing a crystalline hydrate of COMPOUND as disclosed herein to relative ambient humidity means to allow the a crystalline hydrate of COMPOUND to come into contact with a carrier gas (moving or stationary), said carrier gas comprising air, nitrogen or argon, said carrier gas exhibiting more than 70%; in particular more than 80% relative humidity.

The crystalline hydrates of COMPOUND according to any one of the embodiments disclosed herein may be used as medicaments, e.g. in the form of pharmaceutical compositions for enteral or parenteral, especially injectable administration.

18) Another embodiment relates to a crystalline hydrate of COMPOUND according to any one of embodiments 1) to 9) for use as a medicament.

The crystalline hydrate of COMPOUND according to any one of embodiments 1) to 9) may be used as single crystalline hydrate or as a mixture with other crystalline stoichiometric or non-stoichiometric hydrates and/or amorphous material of COMPOUND.

19) A further embodiment relates to pharmaceutical compositions comprising as active ingredient a crystalline hydrate of COMPOUND according to any one of embodiments 1) to 9), and at least one pharmaceutically acceptable carrier material (notably water).

The production of the pharmaceutical compositions can be effected in a manner which will be familiar to any person skilled in the art (see for example Remington, *The Science and Practice of Pharmacy*, 21st Edition (2005), Part 5, "Pharmaceutical Manufacturing" [published by Lippincott Williams & Wilkins]) by bringing the crystalline form of the present invention, optionally in combination with other therapeutically valuable substances, into a galenical administration form together with suitable, non-toxic, inert, pharmaceutically acceptable solid or liquid carrier materials and, if desired, usual pharmaceutical adjuvants.

20) A further embodiment relates to the use of the crystalline hydrate of COMPOUND according to any one of embodiments 1) to 9) in the manufacture of an aqueous pharmaceutical composition.

21) A further embodiment relates to a process of manufacture an aqueous pharmaceutical composition, said process comprising dissolving the crystalline hydrate of COMPOUND according to any one of embodiments 1) to 9) (notably in a solvent such as water).

22) A further embodiment relates to the crystalline hydrate of COMPOUND according to any one of embodiments 1) to 9) for use in the manufacture of an aqueous pharmaceutical composition, wherein said pharmaceutical composition is used as a medicament.

23) A further embodiment relates to the crystalline hydrate of COMPOUND according to any one of embodiments 1) to 9) for use in the manufacture of an aqueous pharmaceutical composition, wherein said pharmaceutical composition is used for the prevention/prophylaxis and/or treatment of cerebral vasospasm and its subsequent ischemic effects and/or symptoms after aneurysmal subarachnoid hemorrhage (aSAH).

24) A further embodiment relates to the crystalline hydrate of COMPOUND according to any one of embodiments 1) to 9) for use in the manufacture of an aqueous pharmaceutical composition, wherein said pharmaceutical composition is used for the prevention/prophylaxis and/or treatment of clinical deterioration due to vasospasm-related delayed cerebral ischemia following aneurysmal subarachnoid hemorrhage (aSAH).

25) A further embodiment relates to the crystalline hydrate of COMPOUND according to any one of embodiments 1) to 9) for use in the manufacture of an aqueous pharmaceutical composition, wherein said pharmaceutical composition is used for the prevention/prophylaxis and/or treatment of clinical deterioration due to vasospasm-related delayed cerebral ischemia following aneurysmal subarachnoid hemorrhage (aSAH).

The term "clinical deterioration" as used herein refers to a worsening of at least two points compared to the reference score, on the mGCS or the aNIHSS scales, lasting for at least 2 hours, which cannot be entirely attributed to causes other than cerebral vasospasm. Clinical deterioration due to delayed cerebral ischemia may be adjudicated based on review of clinical data, case narratives, angiograms and/or CT scans. The term "mGCS" refers to the Glasgow Coma Scale, which is a neurological scale aiming to give a reliable and objective way of recording the state of a person's consciousness. The term "aNIHSS" refers to the abbreviated National Institutes of Health Stroke Scale: a tool used by healthcare providers to objectively quantify the impairment caused by a stroke.

26) A further embodiment relates to the crystalline hydrate of COMPOUND according to any one of embodiments 1) to 9) for use in the manufacture of an aqueous pharmaceutical composition, wherein said pharmaceutical composition is used for the prevention/prophylaxis and/or treatment of cerebral infarction.

The term "cerebral infarction" as used herein refers to all-cause new or worsened cerebral infarction (notably said infraction having a total volume of more than about 5 cm³). New or worsened cerebral infarctions may be determined by central radiology review comparing CT scans performed 16 days after initiation of therapy with a drug with the CT scan performed before said initiation of therapy.

27) A further embodiment relates to the crystalline hydrate of COMPOUND according to any one of embodiments 1) to 9) for use as a medicament; notably for use in the prevention/prophylaxis and/or treatment of a disease or disorder, where endothelin receptors are involved; especially for use for the prevention/prophylaxis and/or treatment of cerebral vasospasm and its subsequent ischemic effects and/or symptoms after aneurysmal subarachnoid hemorrhage (aSAH).

The present invention also relates to a method for the prevention/prophylaxis and/or treatment of a disease or disorder, where endothelin receptors are involved, especially in the prevention/prophylaxis and/or treatment of cerebral vasospasm and its subsequent ischemic effects and/or symptoms after aneurysmal subarachnoid hemorrhage (aSAH), said prevention/prophylaxis and/or treatment comprising administering to a subject in need of such prevention/prophylaxis and/or treatment a pharmaceutical composition, said composition comprising, as an active ingredient, an effective amount of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide in the form of an aqueous solution of the crystalline hydrate of COMPOUND according to any one of embodiments 1) to 9).

5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide (clazosentan free acid), as used herein, refers to the compound of Formula 2

Formula 2

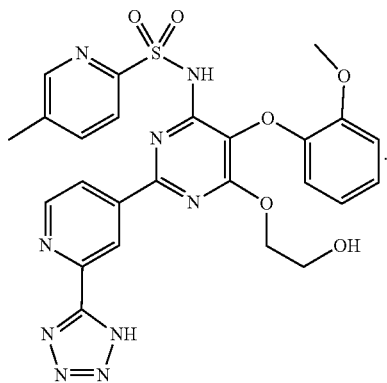

The term "effective amount" as used herein refers to a dose from about 5 mg/day to about 20 mg/day (especially from about 10 mg/day to about 15 mg/day) administered to a subject for up to 20 days (especially for up to 14 days). The effective amount is preferably administered intravenously and more preferably intravenously as a solution in water.

The term "solvate(s)" either used alone or in combination is understood in the context of the present invention to mean an aggregate comprising a compound or a salt thereof as defined herein and one or more molecules of a solvent. Hydrates are a special form of solvates, wherein the one or more solvent molecules comprised in said aggregate are water molecules.

The term "wt." signifies weight (e.g. in kg) of a substance (e.g. reactant) per weight (e.g. in kg) of a starting material (such as COMPOUND) or a solvent (such as water).

The term "equivalent(s)", also abbreviated "eq.", refers to the number of moles of a compound that reacts with (or is equivalent to) an arbitrary number of moles of another compound in a given chemical reaction. In the case of solvates/hydrates of COMPOUND as disclosed herein, said term refers to the number of molecules of solvent/water per one molecule of COMPOUND.

The term "prevention" as used herein also means prophylaxis.

COMPOUND in its crystalline forms as disclosed herein may be present in different isomeric/tautomeric forms with respect to the position of the sodium atom in the tetrazole ring and/or in the sulfonamide group as depicted below.

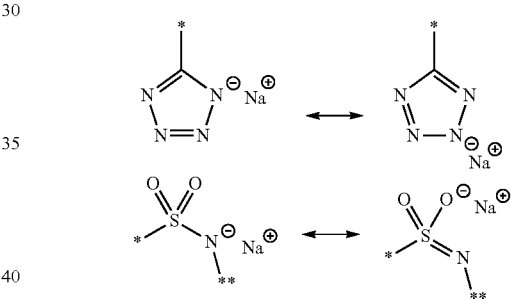

It is thus understood that all possible isomers/tautomers of COMPOUND in its crystalline hydrate forms are within the scope of the present invention, even though only one isomer/tautomer may be described herein (e.g. Formula 1). In solution, said isomers/tautomers exist usually as mixtures of different isomeric/tautomeric forms; in the solid state typically one form predominates. The asterisks "*" and "**" in the formulas hereinabove denote the point of attachment of the corresponding group to the rest of the molecule of COMPOUND.

Based on the dependencies of the different embodiments 1) to 27) as disclosed hereinabove, the following embodiments are thus possible and intended and herewith specifically disclosed in individualized form:

2+1, 3+1, 4+1, 5+1, 5+2+1, 5+3+1, 6+1, 6+2+1, 6+3+1, 6+4+1, 6+5+1, 6+5+2+1, 6+5+3+1, 7+1, 7+2+1, 7+3+1, 7+4+1, 7+5+1, 7+5+2+1, 7+5+3+1, 8+1, 8+2+1, 8+3+1, 8+4+1, 8+5+1, 8+5+2+1, 8+5+3+1, 9+1, 9+2+1, 9+3+1, 9+4+1, 9+5+1, 9+5+2+1, 9+5+3+1, 10+1, 10+2+1, 10+3+1, 10+4+1, 10+5+1, 10+5+2+1, 10+5+3+1, 10+6+1, 10+6+2+1, 10+6+3+1, 10+6+4+1, 10+6+5+1, 10+6+5+2+1, 10+6+5+3+1, 10+7+1, 10+7+2+1, 10+7+3+1, 10+7+4+1, 10+7+5+1, 10+7+5+2+1, 10+7+5+3+1, 10+8+1, 10+8+2+1, 10+8+3+1, 10+8+4+1, 10+8+5+1, 10+8+5+2+1, 10+8+5+3+1, 10+9+1, 10+9+2+1, 10+9+3+1, 10+9+4+1, 10+9+5+1,

10+9+5+2+1, 10+9+5+3+1, 11+1, 11+2+1, 11+3+1, 11+4+1, 11+5+1, 11+5+2+1, 11+5+3+1, 11+6+1, 11+6+2+1, 11+6+3+1, 11+6+4+1, 11+6+5+1, 11+6+5+2+1, 11+6+5+3+1, 11+7+1, 11+7+2+1, 11+7+3+1, 11+7+4+1, 11+7+5+1, 11+7+5+2+1, 11+7+5+3+1, 11+8+1, 11+8+2+1, 11+8+3+1, 11+8+4+1, 11+8+5+1, 11+8+5+2+1, 11+8+5+3+1, 11+9+1, 11+9+2+1, 11+9+3+1, 11+9+4+1, 11+9+5+1, 11+9+5+2+1, 11+9+5+3+1, 12+1, 12+2+1, 12+3+1, 12+4+1, 12+5+1, 12+5+2+1, 12+5+3+1, 12+6+1, 12+6+2+1, 12+6+3+1, 12+6+4+1, 12+6+5+1, 12+6+5+2+1, 12+6+5+3+1, 12+7+1, 12+7+2+1, 12+7+3+1, 12+7+4+1, 12+7+5+1, 12+7+5+2+1, 12+7+5+3+1, 12+8+1, 12+8+2+1, 12+8+3+1, 12+8+4+1, 12+8+5+1, 12+8+5+2+1, 12+8+5+3+1, 12+9+1, 12+9+2+1, 12+9+3+1, 12+9+4+1, 12+9+5+1, 12+9+5+2+1, 12+9+5+3+1, 13+1, 13+2+1, 13+3+1, 13+4+1, 13+5+1, 13+5+2+1, 13+5+3+1, 13+6+1, 13+6+2+1, 13+6+3+1, 13+6+4+1, 13+6+5+1, 13+6+5+2+1, 13+6+5+3+1, 13+7+1, 13+7+2+1, 13+7+3+1, 13+7+4+1, 13+7+5+1, 13+7+5+2+1, 13+7+5+3+1, 13+8+1, 13+8+2+1, 13+8+3+1, 13+8+4+1, 13+8+5+1, 13+8+5+2+1, 13+8+5+3+1, 13+9+1, 13+9+2+1, 13+9+3+1, 13+9+4+1, 13+9+5+1, 13+9+5+2+1, 13+9+5+3+1, 14+1, 14+2+1, 14+3+1, 14+4+1, 14+5+1, 14+5+2+1, 14+5+3+1, 14+6+1, 14+6+2+1, 14+6+3+1, 14+6+4+1, 14+6+5+1, 14+6+5+2+1, 14+6+5+3+1, 14+7+1, 14+7+2+1, 14+7+3+1, 14+7+4+1, 14+7+5+1, 14+7+5+2+1, 14+7+5+3+1, 14+8+1, 14+8+2+1, 14+8+3+1, 14+8+4+1, 14+8+5+1, 14+8+5+2+1, 14+8+5+3+1, 14+9+1, 14+9+2+1, 14+9+3+1, 14+9+4+1, 14+9+5+1, 14+9+5+2+1, 14+9+5+3+1, 15+1, 15+2+1, 15+3+1, 15+4+1, 15+5+1, 15+5+2+1, 15+5+3+1, 15+6+1, 15+6+2+1, 15+6+3+1, 15+6+4+1, 15+6+5+1, 15+6+5+2+1, 15+6+5+3+1, 15+7+1, 15+7+2+1, 15+7+3+1, 15+7+4+1, 15+7+5+1, 15+7+5+2+1, 15+7+5+3+1, 15+8+1, 15+8+2+1, 15+8+3+1, 15+8+4+1, 15+8+5+1, 15+8+5+2+1, 15+8+5+3+1, 15+9+1, 15+9+2+1, 15+9+3+1, 15+9+4+1, 15+9+5+1, 15+9+5+2+1, 15+9+5+3+1, 18+1, 18+2+1, 18+3+1, 18+4+1, 18+5+1, 18+5+2+1, 18+5+3+1, 18+6+1, 18+6+2+1, 18+6+3+1, 18+6+4+1, 18+6+5+1, 18+6+5+2+1, 18+6+5+3+1, 18+7+1, 18+7+2+1, 18+7+3+1, 18+7+4+1, 18+7+5+1, 18+7+5+2+1, 18+7+5+3+1, 18+8+1, 18+8+2+1, 18+8+3+1, 18+8+4+1, 18+8+5+1, 18+8+5+2+1, 18+8+5+3+1, 18+9+1, 18+9+2+1, 18+9+3+1, 18+9+4+1, 18+9+5+1, 18+9+5+2+1, 18+9+5+3+1, 19+1, 19+2+1, 19+3+1, 19+4+1, 19+5+1, 19+5+2+1, 19+5+3+1, 19+6+1, 19+6+2+1, 19+6+3+1, 19+6+4+1, 19+6+5+1, 19+6+5+2+1, 19+6+5+3+1, 19+7+1, 19+7+2+1, 19+7+3+1, 19+7+4+1, 19+7+5+1, 19+7+5+2+1, 19+7+5+3+1, 19+8+1, 19+8+2+1, 19+8+3+1, 19+8+4+1, 19+8+5+1, 19+8+5+2+1, 19+8+5+3+1, 19+9+1, 19+9+2+1, 19+9+3+1, 19+9+4+1, 19+9+5+1, 19+9+5+2+1, 19+9+5+3+1, 20+1, 20+2+1, 20+3+1, 20+4+1, 20+5+1, 20+5+2+1, 20+5+3+1, 20+6+1, 20+6+2+1, 20+6+3+1, 20+6+4+1, 20+6+5+1, 20+6+5+2+1, 20+6+5+3+1, 20+7+1, 20+7+2+1, 20+7+3+1, 20+7+4+1, 20+7+5+1, 20+7+5+2+1, 20+7+5+3+1, 20+8+1, 20+8+2+1, 20+8+3+1, 20+8+4+1, 20+8+5+1, 20+8+5+2+1, 20+8+5+3+1, 20+9+1, 20+9+2+1, 20+9+3+1, 20+9+4+1, 20+9+5+1, 20+9+5+2+1, 20+9+5+3+1, 21+1, 21+2+1, 21+3+1, 21+4+1, 21+5+1, 21+5+2+1, 21+5+3+1, 21+6+1, 21+6+2+1, 21+6+3+1, 21+6+4+1, 21+6+5+1, 21+6+5+2+1, 21+6+5+3+1, 21+7+1, 21+7+2+1, 21+7+3+1, 21+7+4+1, 21+7+5+1, 21+7+5+2+1, 21+7+5+3+1, 21+8+1, 21+8+2+1, 21+8+3+1, 21+8+4+1, 21+8+5+1, 21+8+5+2+1, 21+8+5+3+1, 21+9+1, 21+9+2+1, 21+9+3+1, 21+9+4+1, 21+9+5+1, 21+9+5+2+1, 21+9+5+3+1, 22+1, 22+2+1, 22+3+1, 22+4+1, 22+5+1, 22+5+2+1, 22+5+3+1, 22+6+1, 22+6+2+1, 22+6+3+1, 22+6+4+1, 22+6+5+1, 22+6+5+2+1, 22+6+5+3+1, 22+7+1, 22+7+2+1, 22+7+3+1, 22+7+4+1, 22+7+5+1, 22+7+5+2+1, 22+7+5+3+1, 22+8+1, 22+8+2+1, 22+8+3+1, 22+8+4+1, 22+8+5+1, 22+8+5+2+1, 22+8+5+3+1, 22+9+1, 22+9+2+1, 22+9+3+1, 22+9+4+1, 22+9+5+1, 22+9+5+2+1, 22+9+5+3+1, 23+1, 23+2+1, 23+3+1, 23+4+1, 23+5+1, 23+5+2+1, 23+5+3+1, 23+6+1, 23+6+2+1, 23+6+3+1, 23+6+4+1, 23+6+5+1, 23+6+5+2+1, 23+6+5+3+1, 23+7+1, 23+7+2+1, 23+7+3+1, 23+7+4+1, 23+7+5+1, 23+7+5+2+1, 23+7+5+3+1, 23+8+1, 23+8+2+1, 23+8+3+1, 23+8+4+1, 23+8+5+1, 23+8+5+2+1, 23+8+5+3+1, 23+9+1, 23+9+2+1, 23+9+3+1, 23+9+4+1, 23+9+5+1, 23+9+5+2+1, 23+9+5+3+1, 24+1, 24+2+1, 24+3+1, 24+4+1, 24+5+1, 24+5+2+1, 24+5+3+1, 24+6+1, 24+6+2+1, 24+6+3+1, 24+6+4+1, 24+6+5+1, 24+6+5+2+1, 24+6+5+3+1, 24+7+1, 24+7+2+1, 24+7+3+1, 24+7+4+1, 24+7+5+1, 24+7+5+2+1, 24+7+5+3+1, 24+8+1, 24+8+2+1, 24+8+3+1, 24+8+4+1, 24+8+5+1, 24+8+5+2+1, 24+8+5+3+1, 24+9+1, 24+9+2+1, 24+9+3+1, 24+9+4+1, 24+9+5+1, 24+9+5+2+1, 24+9+5+3+1, 25+1, 25+2+1, 25+3+1, 25+4+1, 25+5+1, 25+5+2+1, 25+5+3+1, 25+6+1, 25+6+2+1, 25+6+3+1, 25+6+4+1, 25+6+5+1, 25+6+5+2+1, 25+6+5+3+1, 25+7+1, 25+7+2+1, 25+7+3+1, 25+7+4+1, 25+7+5+1, 25+7+5+2+1, 25+7+5+3+1, 25+8+1, 25+8+2+1, 25+8+3+1, 25+8+4+1, 25+8+5+1, 25+8+5+2+1, 25+8+5+3+1, 25+9+1, 25+9+2+1, 25+9+3+1, 25+9+4+1, 25+9+5+1, 25+9+5+2+1, 25+9+5+3+1, 26+1, 26+2+1, 26+3+1, 26+4+1, 26+5+1, 26+5+2+1, 26+5+3+1, 26+6+1, 26+6+2+1, 26+6+3+1, 26+6+4+1, 26+6+5+1, 26+6+5+2+1, 26+6+5+3+1, 26+7+1, 26+7+2+1, 26+7+3+1, 26+7+4+1, 26+7+5+1, 26+7+5+2+1, 26+7+5+3+1, 26+8+1, 26+8+2+1, 26+8+3+1, 26+8+4+1, 26+8+5+1, 26+8+5+2+1, 26+8+5+3+1, 26+9+1, 26+9+2+1, 26+9+3+1, 26+9+4+1, 26+9+5+1, 26+9+5+2+1, 26+9+5+3+1, 27+1, 27+2+1, 27+3+1, 27+4+1, 27+5+1, 27+5+2+1, 27+5+3+1, 27+6+1, 27+6+2+1, 27+6+3+1, 27+6+4+1, 27+6+5+1, 27+6+5+2+1, 27+6+5+3+1, 27+7+1, 27+7+2+1, 27+7+3+1, 27+7+4+1, 27+7+5+1, 27+7+5+2+1, 27+7+5+3+1, 27+8+1, 27+8+2+1, 27+8+3+1, 27+8+4+1, 27+8+5+1, 27+8+5+2+1, 27+8+5+3+1, 27+9+1, 27+9+2+1, 27+9+3+1, 27+9+4+1, 27+9+5+1, 27+9+5+2+1, or 27+9+5+3+1.

In the list above the numbers refer to the embodiments according to their numbering provided hereinabove whereas "+" indicates the dependency from another embodiment. The different individualized embodiments are separated by commas. In other words, "5+2+1" for example refers to embodiment 5) depending on embodiment 2), depending on embodiment 1), i.e. embodiment "5+2+1" corresponds to embodiment 5) further characterized by the features of the embodiments 2) and 1).

ABBREVIATIONS (AS USED HEREINBEFORE OR HEREINAFTER)

EtOH Ethanol
eq. Equivalent(s)
GVS Gravimetric vapor sorption analysis
h Hour(s)
kV Kilovolt(s)
mA Milliampere(s)
mbar Milibar(s)
MeOH Methanol
mg Milligram(s)
min Minute(s)
mL Milliliter(s)
mm Millimeter(s)
nm Nanometer(s)
n/a Not applicable
NaOMe Sodium methoxide
ppm parts per million
RH Relative humidity
rt Room temperature rpm Revolutions per minute
s Second(s)
TGA
XRPD X-ray powder difraction
wt. Weight(s)
w/w Weight per weight Experimental Part All temperatures are stated in ° C.

X-Ray Powder Diffraction (XRPD)

X-ray diffractograms were measured on a Bruker D8 Advance diffractometer with FlipStick™ sample stage, Cu Kα radiation (40 kV, 40 mA), and 1D-linear LynxEye™ detector. Samples were prepared on a silicon single crystal sample holder with a cavity of 25 mm diameter and 0.1- or 0.5-mm depth. The powder was spread with a microscope slide to obtain a flat surface. Diffractograms were collected in the reflection mode with coupled θ/2θ angles in the range from 3-50° 2θ, an increment of 0.02° and an accumulation time of 0.4 s or 1.6 s per step. The divergence and the antiscatter slit were set to 0.3°. The samples were continuously rotated with 30 rpm during the measurement. 2θ values of peak positions are given with an accuracy of +/−0.2°.

Thermogravimetric Analyses (TGA)

Thermogravimetric analyses were performed with a TGA/SDTA851e module from Mettler Toledo™ coupled to a Pfeiffer ThermoStar™ quadrupole mass spectrometer. Samples of ca. 5 mg were weighed into aluminum pans and heated with a constant rate of 10° C./min from room temperature to 250° C. or 350° C. in a flow of nitrogen. On a case by case basis, the off gases were analyzed by mass spectrometry with regards to specific volatiles that were expected to be present.

Gravimetric Vapor Sorption (GVS) Analysis

Gravimetric vapor sorption analysis of form C was performed on a Hiden Isochema IGAsorp™ Model HAS-036-080. Approximately 20 mg of the sample was placed without any pre-treatment into a stainless-steel mesh sample holder. The measurement was run at 25° C. with changing the humidity in the order 40%-95%-0%-40% RH by steps of 5% RH and with maximum equilibration time of 24 h at each step. Gravimetric vapor sorption experiments for all the other hydrates disclosed herein were performed on a SPS 100n instrument from ProUmid GmbH & Co. KG. Typically, 10-20 mg of material were placed into tared aluminum pans without any pre-treatment. The measurements were again run at 25° C. and with changing the humidity in the order 20%-90%-0%-25% RH by steps of 5% and with maximum equilibration time of 24 h at each step. When plotting the data (see corresponding Figures), weight changes of one equivalent of water are indicated by dotted horizontal lines.

COMPOUND may be synthesized by known procedures in the art such as according to EP0979822.

Example 1—Preparation of COMPOUND in Solid Form B (Tri-Methanol Solvate)

A suspension of 209 mg COMPOUND in 1 mL MeOH was stirred at room temperature for 1 month. The solid was isolated by filtration. TGA showed a weight loss of 13.8% between 55° C. and 160° C. The release of MeOH and water is detected by mass-spectrometric analysis of the off gases. Assuming the weight loss step is mainly related to MeOH, it corresponds to three equivalents of MeOH. Additional weight is lost below 55° C., which is attributed to surface adsorbed solvent. The XRPD of the sample (FIG. 1) exhibits a pattern characteristic for form B.

Example 2—Preparation of COMPOUND in Solid Form B1 (Di-Ethanol Solvate)

A suspension of 513 mg COMPOUND in 4 mL EtOH was stirred at room temperature for 2 days. The solid was isolated by filtration. TGA showed a broad weight loss step of 13.7% between 80 and 230° C. The release of EtOH is confirmed by mass-spectrometric analysis of the off gases. The weight loss corresponds to two equivalents of EtOH. The XRPD of the sample (FIG. 2) exhibits a pattern characteristic for form B1.

Example 3—Preparation of COMPOUND in Solid Form C (Pentahydrate)

1 g of dry COMPOUND was dissolved in 2 mL water under heating. Upon cooling, the solution turned slightly turbid. 20 mL 2-propanol were added dropwise while stirring and an abundant precipitation sat in after addition of about half of the volume of 2-propanol. Stirring was continued at rt for two weeks before the solid was filtered off. The sample was left open at ambient conditions for 1 day and was then stored at 85% RH for ten days. 1.04 g of a white, free-flowing powder was obtained. TGA of COMPOUND in solid form C shows a weight loss step ranging from about 50° C. to 150° C. (FIG. 16) amounting to about 12.2% relative to the wet material, which corresponds to 4.8 equivalents of water. According to the GVS analysis (FIG. 10), the water content of the sample is stable with a slight increase between 5% and 95% RH at 25° C. and decreases dramatically below 5% RH. Under the assumption that all water is removed at 0% RH, the water content of solid form C ranges from 13% to 14.5% relative to the dry weight, which corresponds to 4.5 to 5.0 equivalents of water. The water content at the starting point at 40% RH amounts to 14% (dry basis) and is in good agreement with the weight loss observed in TGA (12.2% wet basis). The XRPD of the sample (FIG. 3) exhibits a pattern characteristic for form C.

Example 4—Preparation of COMPOUND in Solid Form E (Monohydrate)

A sample of 290 mg of the di-ethanol solvate of COMPOUND (form B1) was stored open at ambient conditions for 7 days. TGA showed a broad weight loss step between rt and 180° C., which is attributable to water according to the mass spectrometry analysis of the off gases. The weight loss corresponds to 1.8 equivalents of water. Based on a GVS scan (FIG. 11), the water content at equilibrium amounts to 3% or approx. 1 equivalent. The XRPD of the sample (FIG. 4) exhibits a pattern characteristic for form E.

Example 5—Preparation of COMPOUND in Solid Form L (Trihydrate)

A sample of COMPOUND form C was first dried at 0% relative humidity (RH) and then re-humidified at 40% RH in a GVS experiment. TGA of the product showed a weight loss in two steps in the temperature range from about 50 to 210° C. The total weight loss of 9.4% corresponds to 3.6 equivalents of water. Based on the GVS experiment (FIG. 12), the final water content amounts to about 8%, which corresponds to 3 equivalents of water. The XRPD of the sample (FIG. 5) exhibits a pattern characteristic for form L.

Example 6—Preparation of COMPOUND in Solid Form M (Trihydrate)

A suspension of 97 mg of COMPOUND in 1 mL 2-propanol containing 1.3 wt. % of water was stirred for 2 days at ambient temperature. The solid was isolated by centrifuge filtration. TGA showed a weight loss of 9.0%, which predominantly takes place between 150 and 240° C. Assuming that the small premature weight loss in the TGA analysis is attributable to excess water, the water content of the material amounts to 3 equivalents. According to GVS (FIG. 13), the water content is also best described by a trihydrate structure. The XRPD of the sample (FIG. 6) exhibits a pattern characteristic for form M.

Example 7—Preparation of COMPOUND in Solid Form N (Tetrahydrate)

A suspension of 116 mg of COMPOUND in 1 mL 2-propanol containing 3.8% w/w of water was stirred for 2 days at ambient temperature. The solid was isolated by centrifugal filtration. TGA showed a weight loss of 11.3% over a broad temperature range from ca. 50° C. to 230° C., corresponding to slightly more than 4 equivalents of water. Based on the GVS behavior (FIG. 14), the material can be attributed to a tetrahydrate with a noticeable adsorption of excess water with increasing relative humidity. The XRPD of the sample (FIG. 7) exhibits a pattern characteristic for form N.

Example 8—Preparation of COMPOUND in Solid Form P (Trihydrate)

A solid sample of COMPOUND originating from the drying of a solvated structure similar to form B1 was exposed to a relative humidity of 63% for 15 hours at 25° C. Based on the water uptake in a GVS experiment (FIG. 15) starting from the same material, the polymorphic form can be attributed to a trihydrate. The XRPD of the sample (FIG. 8) exhibits a pattern characteristic for form P.

Reference Example 1—Preparation of COMPOUND According to Example 9 of EP0979822

Figure 9:
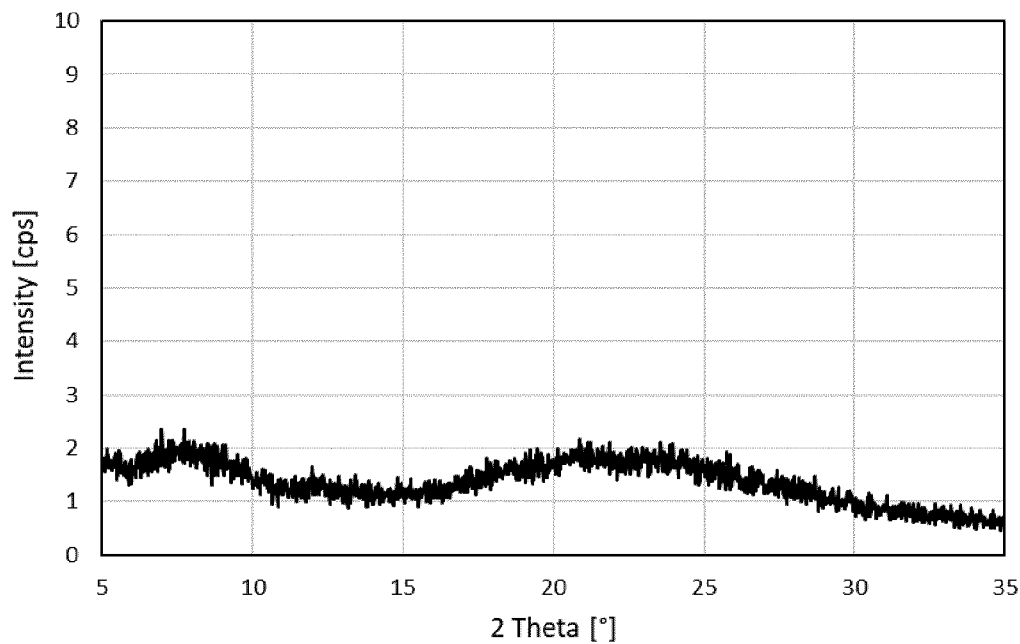
FIG. 9 shows the X-ray powder diffractogram of the solid product of Reference Example 1.

2 g (3.5 mmol) of 5-methyl-pyridine-2-sulfonic acid {6-(2-hydroxy-ethoxy)-5-(2-methoxy-phenoxy)-2-[2-(1 H-tetrazol-5-yl)-pyridin-4-yl]-pyrimidin-4-yl}-amide were suspended in 10 mL MeOH and thereafter 1.3 mL (7 mmol) of a freshly prepared 5.4 N NaOMe solution were added. The solution was heated to reflux for 3 h and cooled down first to room temperature within about 25 minutes and then further to 0° C. until solid material was formed. The solid was then separated by filtration, washed with 3 mL ice-cold methanol and dried overnight at 70° C. in vacuo (10 mbar). The XRPD of the resulting solid material is displayed in FIG. 9 showing a broad halo characteristic for amorphous solid materials.

The invention claimed is:

1. A crystalline hydrate of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide disodium salt, wherein said hydrate is characterized by the presence of peaks in the X-ray powder diffractogram at the following angles of refraction 2θ:7.6°, 24.3°, and 25.0°.

2. The crystalline hydrate according to claim 1, wherein said hydrate is characterized by the presence of peaks in the X-ray powder diffractogram at the following angles of refraction 2θ:7.6°, 10.6°, 18.5°, 24.3°, and 25.0°.

3. The crystalline hydrate according to claim 1, wherein said hydrate is characterized by the presence of peaks in the X-ray powder diffractogram at the following angles of refraction 2θ:7.4°, 7.6°, 10.6°, 12.0°, 16.7°, 18.5°, 22.8°, 24.3°, 25.0° and 25.4°.

4. The crystalline hydrate according to claim 1, which shows the X-ray powder diffraction pattern as depicted in FIG. 3.

5. A process of manufacture of the crystalline hydrate according to claim 1, wherein the process comprises exposing a first crystalline hydrate of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide disodium salt to a relative ambient humidity of at least 70% until the crystalline hydrate according to claim 1 is formed, said first crystalline hydrate comprising from about 1 to about 4 equivalents of coordinated water.

6. A process of manufacture of the crystalline hydrate according to claim 1, said process comprising precipitating 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide disodium salt from an aqueous solution by adding at least one water miscible organic solvent to said solution, such that the water activity in the mixture of water and the water miscible organic solvent(s) is at least 0.2.

7. A pharmaceutical composition comprising the crystalline hydrate according to claim 1, and at least one pharmaceutically acceptable carrier material.

8. A process of manufacture of an aqueous pharmaceutical composition, said process comprising the step of dissolving the crystalline hydrate according to claim 1.

9. A method for the prevention/prophylaxis and/or treatment of a disease or disorder, where endothelin receptors are involved, said prevention/prophylaxis and/or treatment comprising administering to a subject in need of such prevention/prophylaxis and/or treatment a pharmaceutical composition, said composition comprising an effective amount of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide in the form of an aqueous solution of the crystalline hydrate according to claim 1.

10. A process of manufacture of the crystalline hydrate according to claim 2, wherein the process comprises exposing a first crystalline hydrate of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide disodium salt to a relative ambient humidity of at least 70% until the crystalline hydrate according to claim 2 is formed, said first crystalline hydrate comprising from about 1 to about 4 equivalents of coordinated water.

11. A process of manufacture of the crystalline hydrate according to claim 2, said process comprising precipitating 5-methyl-pyridine-2-sulfonic acid N-{6-(2-hydroxy-ethoxy)-5-(2-methoxy-phenoxy)-2-[2-(1H-tetrazol-5-yl)- pyridin-4-yl]-pyrimidin-4-yl}-amide disodium salt from an aqueous solution by adding at least one water miscible organic solvent to said solution, such that the water activity in the mixture of water and the water miscible organic solvent(s) is at least 0.2.

12. A process of manufacture of the crystalline hydrate according to claim 3, wherein the process comprises exposing a first crystalline hydrate of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide disodium salt to a relative ambient humidity of at least 70% until the crystalline hydrate according to claim 3 is formed, said first crystalline hydrate comprising from about 1 to about 4 equivalents of coordinated water.

13. A process of manufacture of the crystalline hydrate according to claim 3, said process comprising precipitating 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide disodium salt from an aqueous solution by adding at least one water miscible organic solvent to said solution, such that the water activity in the mixture of water and the water miscible organic solvent(s) is at least 0.2.

14. A process of manufacture of an aqueous pharmaceutical composition, said process comprising the step of dissolving the crystalline hydrate according to claim 2.

15. A process of manufacture of an aqueous pharmaceutical composition, said process comprising the step of dissolving the crystalline hydrate according to claim 3.

16. A process of manufacture of an aqueous pharmaceutical composition, said process comprising the step of dissolving the crystalline hydrate according to claim 4.

17. A method for the prevention/prophylaxis and/or treatment of a disease or disorder, where endothelin receptors are involved, said prevention/prophylaxis and/or treatment comprising administering to a subject in need of such prevention/prophylaxis and/or treatment a pharmaceutical composition, said composition comprising an effective amount of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide in the form of an aqueous solution of the crystalline hydrate according to claim 2.

18. A method for the prevention/prophylaxis and/or treatment of a disease or disorder, where endothelin receptors are involved, said prevention/prophylaxis and/or treatment comprising administering to a subject in need of such prevention/prophylaxis and/or treatment a pharmaceutical composition, said composition comprising an effective amount of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide in the form of an aqueous solution of the crystalline hydrate according to claim 3.

19. A method for the prevention/prophylaxis and/or treatment of a disease or disorder, where endothelin receptors are involved, said prevention/prophylaxis and/or treatment comprising administering to a subject in need of such prevention/prophylaxis and/or treatment a pharmaceutical composition, said composition comprising an effective amount of 5-methyl-pyridine-2-sulfonic acid N-{6-(2-hydroxy-ethoxy)-5-(2-methoxy-phenoxy)-2-[2-(1H-tetrazol-5-yl)-pyridin-4-yl]-pyrimidin-4-yl}-amide in the form of an aqueous solution of the crystalline hydrate according to claim 4.

* * * * *